(12) United States Patent
Herberth et al.

(10) Patent No.: US 8,959,645 B2
(45) Date of Patent: Feb. 17, 2015

(54) METHOD FOR PROVIDING CONTROL INFORMATION FOR A DISTRIBUTED OPERATION IN AN AUTOMATION SYSTEM, COMPUTER PROGRAM AND AUTOMATION SYSTEM

(75) Inventors: Harald Herberth, Oberasbach (DE); Ulrich Kröger, Kaiserslautern (DE); Allan Sobihard, Bralislava (SK)

(73) Assignee: Siemens Aktiengesellschaft, Munich (DE)

( * ) Notice: Subject to any disclaimer, the term of this patent is extended or adjusted under 35 U.S.C. 154(b) by 849 days.

(21) Appl. No.: 13/063,434

(22) PCT Filed: Sep. 2, 2009

(86) PCT No.: PCT/EP2009/061340
§ 371 (c)(1),
(2), (4) Date: Apr. 8, 2011

(87) PCT Pub. No.: WO2010/028994
PCT Pub. Date: Mar. 18, 2010

(65) Prior Publication Data
US 2011/0314080 A1    Dec. 22, 2011

(30) Foreign Application Priority Data

Sep. 10, 2008   (EP) .................................. 08015970

(51) Int. Cl.
*G06F 21/00*   (2013.01)
*H04L 12/40*   (2006.01)
*G06F 9/54*   (2006.01)

(52) U.S. Cl.
CPC .......... *H04L 12/40013* (2013.01); *G06F 9/547* (2013.01)
USPC .............. 726/25; 726/2; 726/3; 726/4; 726/9; 726/10; 726/21; 726/27; 726/28; 726/29; 726/30; 713/156; 713/157; 713/158; 713/159; 713/175; 713/182; 713/183; 713/184; 713/185

(58) Field of Classification Search
CPC .................................................. G06F 21/6209
USPC ....................... 726/2–4, 21, 27–30, 9–10, 20; 713/182–185, 156–159, 175
See application file for complete search history.

(56) References Cited

U.S. PATENT DOCUMENTS 7,302,533 B2 *  11/2007  Finnie et al. .................. 711/154
7,644,284 B1 *  1/2010  Stubblebine .................. 713/178

(Continued)

OTHER PUBLICATIONS

Riedl M: "Ein objektorientiertes Softwaremodell for verteilte Automatisierungssysteme" Softwaretechnik-Trends, Bd. 25, Nr. 1, Feb. 2005, Seiten 1-6, XP002512306, ISSN: 0720-8928, Gefunden im Internet: URL:http://pi.informatik.uni-siegen.de/stt/25__1/03__Technische_Beitraege/RiedlArtiket.pdf> das ganze Dokument; Others; 2005.

(Continued)

*Primary Examiner* — Josnel Jeudy
(74) *Attorney, Agent, or Firm* — Cozen O'Connor

(57) ABSTRACT

A distributed operation is performed using at least one first and second computer-based object, wherein control information is used to influence or determine a property, a function of the first and/or second computer-based objects. The control information includes details of a parameter identifier, a value associated with the parameter identifier, a range of validity and a remote access attribute. The control information is provided in a retrievable manner, according to the included range of validity, in a memory organized according to ranges of validity and is associated with the first computer-based object. During a function or service call for performing the distributed operation, which is sent from the first computer-based object to the second, the control information is transmitted to the second computer-based object, provided in a retrievable manner in the memory organized according to the ranges of validity and associated with the second computer-based object.

14 Claims, 3 Drawing Sheets

(56) References Cited

U.S. PATENT DOCUMENTS

| | | | |
|---|---|---|---|
| 7,689,646 B2* | 3/2010 | Bachmann et al. | 709/203 |
| 7,716,746 B2* | 5/2010 | Hori et al. | 726/30 |
| 8,024,770 B2* | 9/2011 | Fee et al. | 726/1 |
| 2007/0033148 A1* | 2/2007 | Cahill | 705/65 |
| 2007/0073426 A1 | 3/2007 | Chand | |
| 2009/0235325 A1* | 9/2009 | Dimitrakos et al. | 726/1 |

OTHER PUBLICATIONS

Kakanakov, N., Shopov M, Spasov G: "A New Web-based Multi-tier Model for Distributed Automation Systems", Information Technologies and Control, Bd. 4, Nr. 2, 2006, Seiten 44-48, XP002512318, ISSN: 1312-2622, Gefunden im Internet: URL:http://dsnet.tu-plovdiv.bg/website/members/{mshopov/publications/p6_ITC06_Paper_WorkVer.pdf> das ganze Dokument; Book; 2006.

Crampton J: "On permissions, inheritance and role hierarchies" Proceedings of the 10th ACM Conference on Computer and Communications Security, Bd. -, Nr. -, Oct. 2003, Seiten 85-92, XP002512319 das ganze Dokument; Others; 2003.

& Softvvaretechnik-Trends, Bd. 25, Nr. 1, Feb. 2005, 'Seiten 1-2, XP002512307 Gefunden im Internet: URL:http://pi.informatik.uni-siegen.de/stt/25_1/index.html> das ganze Dokument; Others; 2005.

* cited by examiner

METHOD FOR PROVIDING CONTROL INFORMATION FOR A DISTRIBUTED OPERATION IN AN AUTOMATION SYSTEM, COMPUTER PROGRAM AND AUTOMATION SYSTEM

CROSS-REFERENCE TO RELATED APPLICATIONS

This is a U.S. national stage of International Application No. PCT/EP2009/061340, filed on 2 Sep. 2009. This patent application claims the priority of European Patent Application No. 08015970.0, filed 10 Sep. 2008, the entire content of which application is incorporated herein by reference.

BACKGROUND OF THE INVENTION

1. Field of the Invention

The present invention relates to network security and, more particularly, to a method for providing a control information item for a distributed operation in an automation system.

2. Description of the Related Art

Due to the constantly increasing significance of information technology for automation systems, methods for protecting networked system components, such as monitoring, control and regulatory devices, sensors and actuators, against unauthorized access are becoming increasingly important. In comparison with other areas of application for information technology, data integrity has a particularly high level of importance in automation engineering. Particularly when capturing, evaluating and transmitting measurement and control data, it is necessary to ensure that complete and unaltered data are available. Intentional or unintentional alterations, or alterations caused by a technical error, must be avoided. Furthermore, particular demands in automation engineering for safety-related methods result from message traffic with comparatively many but relatively short messages. It is additionally necessary to take account of realtime capability in an automation system and in its system components.

Granting access to resources provided by computer units within an automation system, and actions performed using the resources, such as requests, initializations or changes, regularly require the provision of context-related information. For example, context-related information includes information about a user or authorizations of the user to perform an action or about a configuration for a computer unit used for a user-selected action. When a computer-based object is used to provide a service from the automation system within a service-oriented architecture, a called service requires the above context-related information to be made available.

Context-related information has to date been provided by additional parameters for a function such as a function for implementing a service. The continuous application of such an approach in a distributed automation system requires each function or application to be able to automatically identify and evaluate context-related information. Furthermore, it is necessary to ensure that context-related information is managed, i.e., stored and provided for other services, by all functions or applications uniformly. This means that global objects need to be provided for managing context-related information, which is extremely complex and susceptible to error and provides little flexibility in respect of possible changes to a system configuration.

As an alternative to the above approach, context-related information is provided for stub-skeleton-based system architectures by additional state information for a stub or skeleton. Here, the context-related information is made available for the stub and can be requested by the skeleton. However, in this case too, all functions or applications need to be able to identify, evaluate and manage appropriate global objects. Inconsistent handling of global objects for managing context-specific information by individual functions or applications can result in inoperable states in an automation system.

SUMMARY OF THE INVENTION

It is therefore an object of the present invention to provide a flexible and safe method for providing a control information item for a distributed operation in an automation system, and for specifying a suitable technical implementation for the method.

This and other objects and advantages are achieved in accordance with the invention by a method, a computer program and by an automation system in which the control information item is used to influence or ascertain a property or function of a first and/or second computer-based object. The distributed operation is performed by at least the first and the second computer-based object. In accordance with the invention, the control information item comprises details about a parameter identifier, a value associated with the parameter identifier, a validity range and a remote access attribute. By way of example, the validity range may specify an association between the control information item and a thread, a computation process or a service. Furthermore, the remote access attribute may be able to denote a function call from a client over a data network to a server within the automation system. The remote access attribute can thus stipulate whether the control information item needs to be forwarded to further computer units within the automation system.

Furthermore, the control information item is provided in retrievable form in line with the validity range which the control information then comprises in a memory unit which is structured based on validity ranges and which is associated with the first computer-based object. The control information item is transmitted to the second computer-based object upon a function or service call, sent from the first to the second computer-based object, for performing the distributed operation. In addition, the control information item is provided in retrievable form in a memory unit which is structured based on validity ranges and which is associated with the second computer-based object. The present invention thus allows a control information item for a distributed operation, which comprises coordinated suboperations running on different computer units in the automation system, to be provided in a manner which can be implemented easily and continuously in a distributed automation system. Here, the computer units may also be virtualized machines, for example.

In accordance with one advantageous embodiment of the present invention, the memory unit associated with the first or second computer-based object is searched for a parameter identifier specified for an access operation when the first or second computer-based object is accessed. If the search is successful, a control information item associated with the parameter identifier specified for the access is provided for an action which is geared toward the first or second computer-based object. By way of example, the validity range may specify an association between the control information item and a thread, a computation process or a service. When a memory unit associated with the first or second computer-based object is searched, a memory area is first examined for threads, then a memory area is examined for services and then a memory area is examined for computation processes, for example, in hierarchic order.

Preferably, the first or second computer-based object is used to provide a service from the automation system within a service-oriented architecture. Service-oriented architectures (SOAs) are geared toward structuring services in complex organizational units and making them available for a large number of users. Here, for example, available components of a data processing system, such as programs, databases, servers or websites, are coordinated such that efforts provided by the components are combined to form services and are made available to authorized users. Service-oriented architectures allow application integration by concealing complexity of individual subcomponents of a data processing system behind standardized interfaces. As a result, safe and flexible provision of a control information item is provided for a computer-based object in an automation system.

By way of example, computer-based objects are (without restricting the general nature of this term) operating systems, control or application programs, services provided by operating systems, control or application programs, service components, service features, functions or procedures, access rights for system resources or peripheral devices and for data located on a storage medium. Here, functions or procedures particularly also comprise enabling of access authorizations in an automation system. Furthermore, a computer-based object may be associated with a computation process which covers all units of an executable computer program loaded into a main memory. By way of example, a computer can be understood to mean PCs, notebooks, servers, PDAs, mobile phones and control and regulatory modules, sensors or actuators in automation, vehicle, communication or medical engineering, i.e., generally devices in which computer programs run or are executed.

Other objects and features of the present invention will become apparent from the following detailed description considered in conjunction with the accompanying drawings. It is to be understood, however, that the drawings are designed solely for purposes of illustration and not as a definition of the limits of the invention. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The invention is explained in more detail below using an exemplary embodiment with reference to the drawing, in which.

DETAILED DESCRIPTION OF THE PREFERRED EMBODIMENTS

Figure 1:
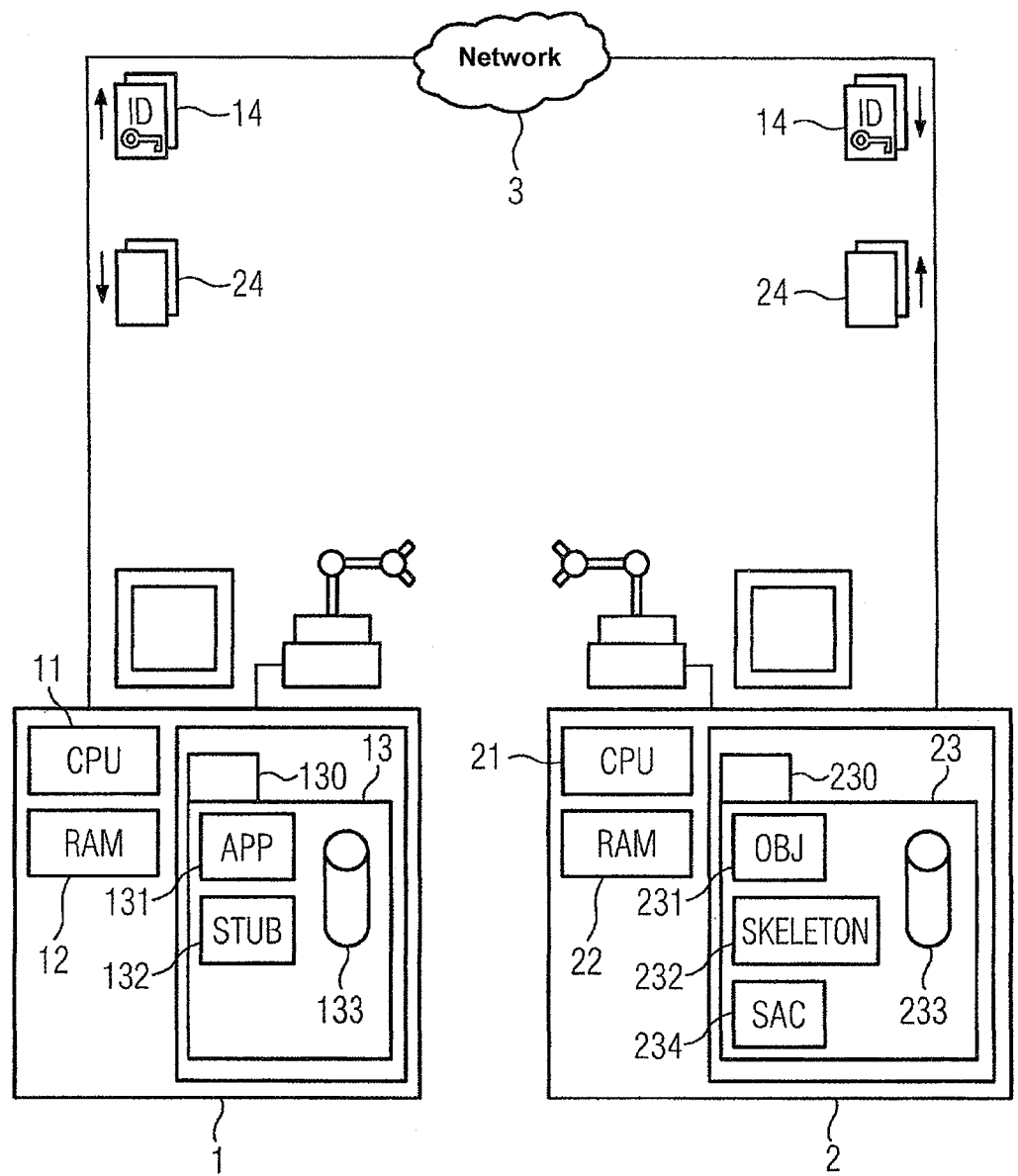
FIG. 1 is a schematic block diagram of an automation system for implementing a method for providing a control information item for a distributed operation in an automation system in accordance with the invention.

The automation system depicted in the FIG. 1 comprises a first computer unit 1 and a second computer unit 2, which are connected to one another as network nodes by a communication network 3. Both computer units 1, 2 respectively comprise at least a processor 11, 21, a main memory 12, 22 and a hard disk 13, 23 for the nonvolatile storage of computer program code, application data and user data.

The hard disk 13 of the first computer unit 1 stores computer program code 130 for providing a first service within a service-oriented architecture, while computer program code stored on the hard disk 23 of the second computer unit is used to provide a second service. The computer program code 130 for the first service comprises computer program code 131 for a client application and computer program code 132 for implementing a stub, which accepts service requests from the client application and resolves the requests based on network nodes providing requested services within the automation system. Furthermore, the first service has an associated memory unit 133 for providing a control information item for a computer-based object 231 stored on the hard disk 23 of the second computer unit 2, which computer-based object 231 is used to implement the second service. In the present exemplary embodiment, the client application and the computer-based object 231 are used to perform a distributed operation within the automation system.

The control information item can be used to influence or ascertain a property or function of the computer-based object 231. The control information item comprises details about a parameter identifier, a value associated with the parameter identifier, a validity range and a remote access attribute. Furthermore, the control information item is provided in retrievable form in line with the validity range which it comprises in a selected memory area of the memory unit 133 associated with the first service.

The validity range, which the control information item comprises specifies an association between the control information item and a thread, a computation process or a service. In the present exemplary embodiment, the validity information item specifies a service. The remote access attribute is used to denote a function call from a client via a data network to a server within the automation system, which is the case in the present exemplary embodiment.

The hard disk 23 stores not only the computer-based object 231 but also computer program code 232 for implementing a skeleton which interacts with the aforementioned stub and computer program code 234 for implementing an authentication component for the second service. In the present exemplary embodiment, the skeleton conveys a service request, resolved by the stub, by the above client application onward to the computer-based object. The computer program code 131, 132, 232, 234 stored on the hard disk 13, 23 and the computer-based object 231 can be loaded into the main memory 12, 22 of the first computer unit 1 and of the second computer unit 2 and can be executed by the respective processor 11, 21 to provide the first and second services, respectively.

In the present exemplary embodiment, the computer-based object 231 is a control program for ascertaining a measurement result that is captured by the second computer unit 2 as a computer-based sensor unit and is requested by the client application running on the first computer unit 1. The control program is used for actuating metrological peripherals of the second computer unit 2. Based on a received measurement result, the client application actuates metrological or actuator peripherals of the first computer unit 1, such as sensors or robots.

In the present exemplary embodiment, the control information item is a token for user authentication, where a user may also be an appliance within the automation system. In other application scenarios, the control information item may also include general user information, environment variables for the client application or machine configuration data.

A call by the second service, which is sent from the client application to the computer-based object 231, prompts the client application, when executed on the first computer unit, to search the memory unit 133 associated with the first service for a parameter identifier specified for the access. Here, the parameter identifier specified is a token. The value associated with the token is an identification for a user calling the second service using the client application. For the validity range of the token, a process is specified in the present example, since the token is intended to be used for all threads within the client application. If the search is successful, the token is provided for an action directed at the computer-based object by the first computer unit 1. The memory unit associated with the first or second computer-based object is initially examined in hierarchical order for tokens with the thread validity range, then for tokens with the service validity range and finally for tokens with the process validity range. The search is terminated when a first search result is ascertained. In this way, hierarchic validity ranges are supported.

A message 14 comprising the call to the second service, initiated by the client application, and the ascertained token is transmitted over the communication network 3 to the second computer unit 2 for further processing. Here, the message 14 is initially preprocessed by the skeleton 232, and then the message 14 is evaluated by the computer-based object 231. When forwarded to the second computer unit 2, the token is assigned a validity range determined by an inheritance rule. By way of example, an original validity range can be retained for forwarding, in principle, or the thread validity range can be assigned, in principle. Further association schemes are possible which follow popular inheritance mechanisms for object attributes and methods, for example.

When authentication using the token by the authentication component for the second service has been successful for the first time, access to the computer-based object 231 is granted and the token is stored in a memory unit 233 associated with the second service. The token is provided in retrievable form in a memory area of the memory unit 233 associated with the second service which is associated with the respective validity range. It is therefore possible to resort to the token for later use upon a fresh access request, for example. Finally, a message 24 with a measurement result ascertained using the computer-based object is transmitted to the first computer unit 1 for evaluation.

For message interchange for the purpose of controlling and monitoring the computer units 1-2, it is necessary to ensure that messages on a path from a transmitter to a receiver are not corrupted. Otherwise, this could result in faults or damage in the automation system. Furthermore, there may be interest in a measurement result captured because of a sequence by a control program, for example, being able to be requested only by an authorized user and a transmitted message with the measurement result not being able to be intercepted and read by unauthorized users.

Figure 2:
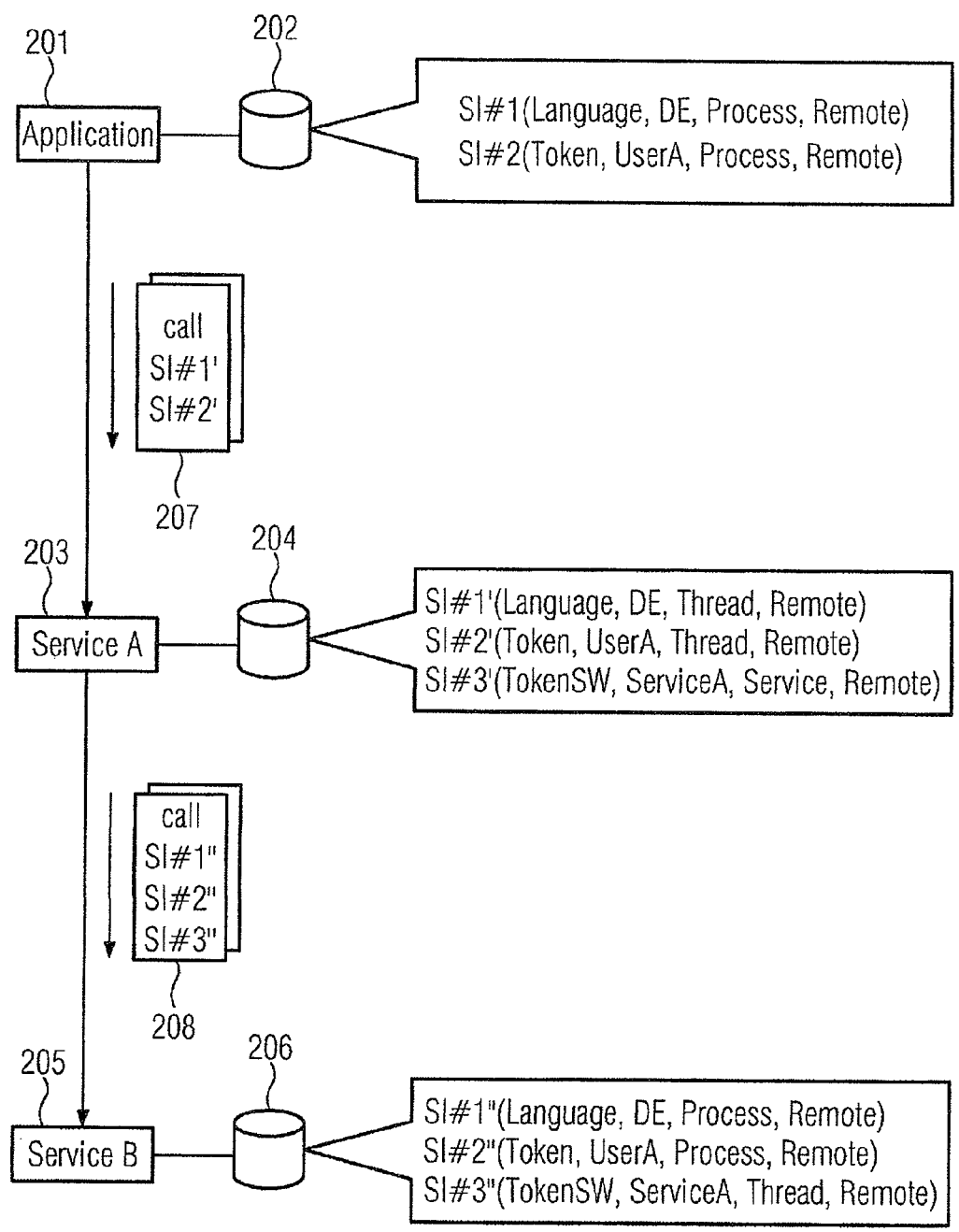
FIG. 2 is a schematic illustration of message interchange between a plurality of computer units involved in a distributed operation in an automation system.

FIG. 2 shows three computer units 201, 203, 205 involved in a distributed operation by way of example. On a first computer unit 201, an application initiating the distributed operation is running which uses a service provided by a second computer unit 203. The service provided by the second computer unit 203 in turn resorts to a service provided by a third computer unit 205. The services and the application are configured, in the present example, such that access requires authentication. Thus, the application needs to authenticate itself to the service provided by the second computer unit 203, and the service in turn needs to authenticate itself to the service provided by the third computer unit 205.

For the purpose of authentication, a first memory unit 202 associated with the application running on the first computer unit 201 stores a control information item. This control information item has the parameter identifier Token, the value UserA corresponding to the identification of the user of the application, the validity range Process and an activated remote access attribute. To take account of country-specific localization and voice information, the first memory unit 202 also stores a control information item which has the parameter identifier Language, the value DE for German, the validity range Process and an activated remote access attribute.

For the purpose of using the service provided by the second computer unit 203, the first computer unit 201 transmits a first message 207 with a service call and control information that is derived from the control information stored in the first memory unit 202 in accordance with an inheritance rule. In accordance with the inheritance rule that is used, all attributes apart from the validity range are taken on without alteration. The validity range is changed from Process to Thread, since the control information is valid only for a thread within the service provided by the second computer unit 203. The control information which the first message 207 comprises is stored in a second memory unit 204 associated with the service provided by the second computer unit 203. In addition, the second memory unit 204 is used to store a control information item for authenticating the service provided by the second computer unit 203. This control information item comprises the parameter identifier Token SW for authenticating a software component, the value service A as a label for the service to be authenticated which is provided by the second computer unit 203, the validity range Service and an activated remote access attribute.

A request for the service provided by the third computer unit 205 involves the second computer unit 203 transmitting a second message 208 with a service call and control information which is derived from the control information stored in the second memory unit 204 in accordance with an inheritance rule. In accordance with the inheritance rule that is used, all attributes apart from the validity range are again taken on without alteration. Here, the validity range is changed from Service to Thread, since the control information is valid only for a thread within the service provided by the third computer unit 205. The control information which the second message 208 comprises is stored in a third memory unit 206 associated with the service provided by the third computer unit 205. Using the control information stored in the memory units 202, 204, 206, the distributed operation is then performed by the application and the services, with authentication operations occurring implicitly by virtue of evaluation of the control information.

The method described above is implemented by a computer program which can be loaded into a main memory of a computer and which has at least one code section, execution of which prompts the control information to be provided in retrievable form in line with a validity range which it comprises in a memory unit which is structured based on validity ranges and which is associated with a first computer-based object. The control information item can be used to influence or ascertain a property and/or function of the first or of a second computer-based object for performing a distributed operation. Furthermore, the control information item comprises details about a parameter identifier, a value associated with the parameter identifier, a validity range and a remote access attribute. In addition, the control information item is transmitted to the second computer-based object upon a function or service call, sent from the first to the second computer-based object, for performing the distributed operation, and the control information item is provided in retrievable form in a memory unit which is structured based on validity ranges and which is associated with the second computer-based object, when the computer program is running in the computer.

Figure 3:
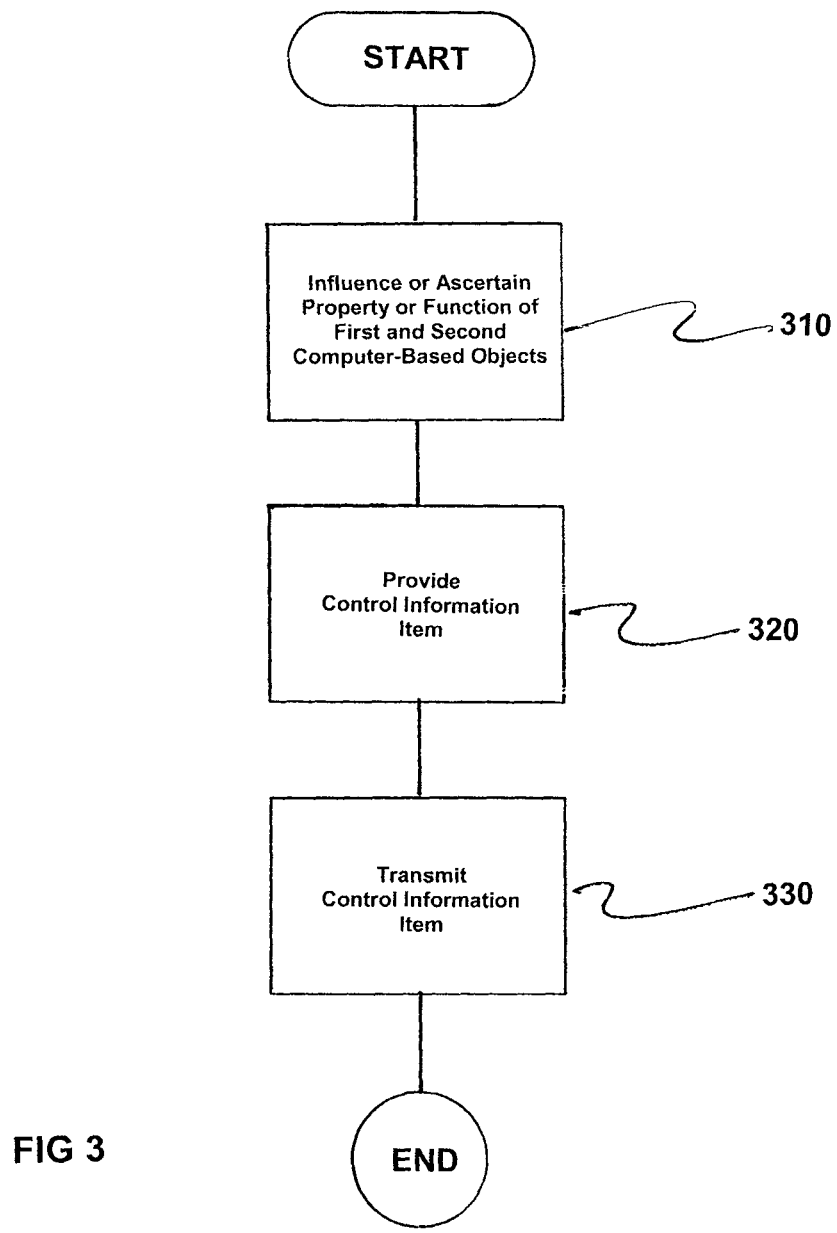
FIG. 3 is a flow chart of the method in accordance with an embodiment of the invention.

FIG. 3 is a flow chart of a method for providing a control information item for a distributed operation in an automation system, where the distributed operation is based on at least a first computer-based object and a second computer-based object. The method comprises influencing or ascertaining, based on the control information item, at least one of a property or function of the first computer-based object and the second computer based object, as indicated in step 310. Here, the control information item comprises details about a parameter identifier, a value associated with the parameter identifier, a validity range and a remote access attribute. The control information item is provided in retrievable form in-line with the validity range which the control information item comprises in a memory unit structured based on validity ranges and associated with the first computer-based object, as indicated in step 320. Next, the control information item is transmitted to the second computer-based object, upon occurrence of a function or service call, from the first computer-based object, for performing the distributed operation and is provided in the retrievable form in the memory unit structured based on the validity ranges and associated with the second computer-based object, as indicated in step 330.

Thus, while there are shown, described and pointed out fundamental novel features of the invention as applied to preferred embodiments thereof, it will be understood that various omissions and substitutions and changes in the form and details of the illustrated apparatus, and in its operation, may be made by those skilled in the art without departing from the spirit of the invention. Moreover, it should be recognized that structures shown and/or described in connection with any disclosed form or embodiment of the invention may be incorporated in any other disclosed or described or suggested form or embodiment as a general matter of design choice.

The invention claimed is:

1. A method for providing a control information item for a distributed operation in an automation system, the distributed operation being based on at least a first computer-based object and a second computer-based object, the method comprising:
   influencing or ascertaining, based on the control information item, at least one of a property or function of at least one of the first computer-based object and the second computer-based object, the control information item comprising details about a parameter identifier, a value associated with the parameter identifier, a validity range and a remote access attribute;
   providing the control information item in retrievable form in-line with the validity range which the control information item comprises in a memory, the memory being structured based on validity ranges and associated with the first computer-based object, the validity range specifying an association between one of (i) the control information item and a thread, (ii) a computation process and (iii) a service; and
   transmitting the control information item to the second computer-based object, upon occurrence of a function or service call, which is sent from the first to the second computer-based object, for performing the distributed operation, the control information item being provided in the retrievable form in the memory structured which is based on the validity ranges and associated with the second computer-based object.

2. The method as claimed in claim 1, further comprising:
   searching the memory associated with the at least the first or second computer-based objects for a parameter identifier specified for an access in a prescribed order in a manner structured based on the validity ranges upon access to the at least the first and second computer-based object; and
   providing the control information item associated with the parameter identifier specified for the access for an action pertaining to the at least the first or second computer-based objects if the search is successful.

3. The method as claimed in claim 1, further comprising:
   associating the control information item, upon being provided in the memory unit associated with the second computer-based object, with the validity range determined by an inheritance rule.

4. The method as claimed in claim 2, further comprising:
   associating the control information item, upon being provided in the memory unit associated with the second computer-based object, with the validity range determined by an inheritance rule.

5. The method as claimed in claim 1, wherein at least one of the at least first and second computer-based objects is used to provide a service from the automation system within a service-oriented architecture.

6. The method as claimed in claim 3, wherein at least one of the at least first and second computer-based objects is used to provide a service from the automation system within a service-oriented architecture.

7. The method as claimed in claim 5, wherein the control information item comprises a token which is transmitted to the service for checking, upon a request for access to at least one of the at least first and second computer-based objects.

8. The method as claimed in claim 7, wherein access to at least one of the at least first and second computer-based objects is granted by the service if the result of the check is positive.

9. The method as claimed in claim 1, wherein the validity range specifies an association between the control information item and one of a thread, a computation process and a service.

10. The method as claimed in claim 9, further comprising initially examining a memory area for threads, examining the memory area services; and subsequently examining the memory area being examined for computation processes to search the memory associated with one of the at least first and second computer-based object.

11. The method as claimed in claim 10, wherein the search is terminated when a first search result is ascertained.

12. The method as claimed in claim 1, wherein the remote access attribute can denote a function call from a client over a data network to a server within the automation system.

13. A main memory of a computer, a computer program being stored in the main memory, the computer program executing on a processor which, when used on the computer causes, the processor to provide a control information item which is loadable into a main memory in the computer and has at least one code section, the computer program comprising:
   program code for providing the control information item in retrievable form in-line with a validity range which the control information comprises in the memory structured based on validity ranges and associated with a first computer-based object, the control information item being utilizable to influence or ascertain at least one of a property and function of the first or second computer-based objects for performing a distributed operation, and the control information item comprising details of a parameter identifier, a value associated with the parameter identifier, a validity range and a remote access attribute, the validity range specifying an association between one of (i) the control information item and a thread, (ii) a computation process and (iii) a service; and program code for transmitting the control information item to the second computer-based object upon occurrence of a function or service call, which is sent from the first to the second computer-based object, for performing the distributed operation, the control information item to be provided in retrievable form in the memory unit which is structured based on the validity ranges and associated with the second computer-based object.

14. An automation system, comprising:

a plurality of computers, interconnected by a communication network, on network nodes of the automation system;

a memory structured based on validity ranges and associated with a first computer-based object for providing a control information item in retrievable form in-line with a validity range which the control information item comprises, the control information item being utilizable to influence or ascertain at least one of a property and function of the first or second computer-based objects for performing a distributed operation, and the control information item comprising details about a parameter identifier, a value associated with the parameter identifier, a validity range and a remote access attribute;

a controller configured to transmit the control information item to the second computer-based object upon occurrence of a function or service call, which is sent from the first computer-based object to the second computer-based object, for performing the distributed operation; and a computer configured to provide the control information item in a retrievable form in the memory which is structured based on the validity ranges and associated with the second computer-based object, the validity range specifying an association between one of (i) the control information item and a thread, (ii) a computation process and (iii) a service.

* * * * *